Figures 1, 3, 4:
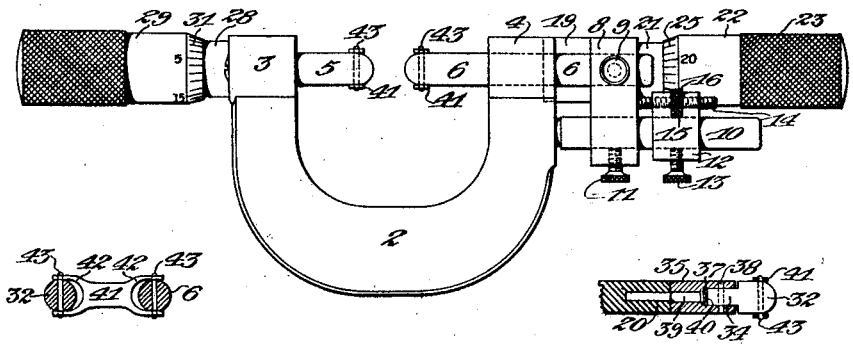

F. G. RENTON.
TAPER GAGING CALIPER.
APPLICATION FILED OCT. 27, 1919.

1,389,381.

Patented Aug. 30, 1921.

Inventor:
Franklin G. Renton
By Arthur F. Armington
Attorney.

UNITED STATES PATENT OFFICE.

FRANKLIN G. RENTON, OF PROVIDENCE, RHODE ISLAND.

TAPER-GAGING CALIPER.

1,389,381.   Specification of Letters Patent.   Patented Aug. 30, 1921.

Application filed October 27, 1919. Serial No. 333,675.

*To all whom it may concern:*

Be it known that I, FRANKLIN G. RENTON, a citizen of the United States, residing at Providence, in the county of Providence, State of Rhode Island, have invented certain new and useful Improvements in Taper-Gaging Calipers, of which the following is a specification.

My invention is an improved micrometer caliper for measuring or gaging tapered pieces having opposite angular faces. The object of my improvement is to provide a measuring tool or instrument adapted for calipering a tapered piece at a plurality of spaced apart points along its length, whereby to measure or gage its taper in proportion to any fixed unit of linear measurement. To this end my improved device consists essentially in two pairs of opposite gaging-elements or points which are adjustable to caliper the sides of the piece to be measured, while being held in constant relation laterally in accordance with a fixed unit of linear measurement.

Figure 2:
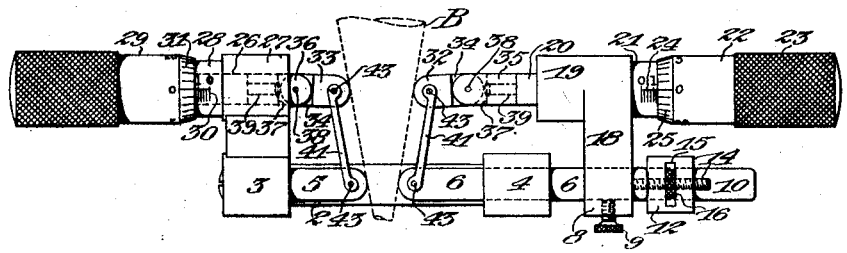
Figures 5, 6:
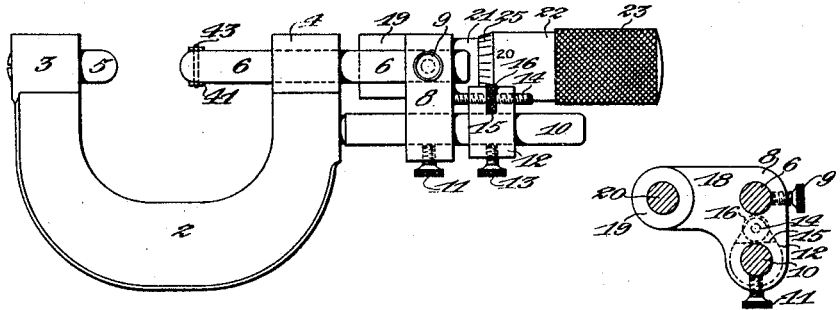

The invention is fully described in the following specification, illustrated by the accompanying drawings, in which like reference characters designate like parts. In the drawings:

Figure 1 is a side view of one embodiment of the invention;

Fig. 2, a plan view of the same;

Fig. 3, a transverse, sectional view of one set of opposite measuring-points of the caliper, showing the connecting link which maintains them at a fixed distance apart;

Fig. 4, a longitudinal sectional view of one of the adjustable calipering-spindles, showing the method of pivoting the gaging-point thereto;

Fig. 5, a detail view of the angular elbow-member which supports one of the calipering-spindles in offset relation to the frame of the instrument;

Fig. 6, a side view of a modified form of the device; and

Figure 7:
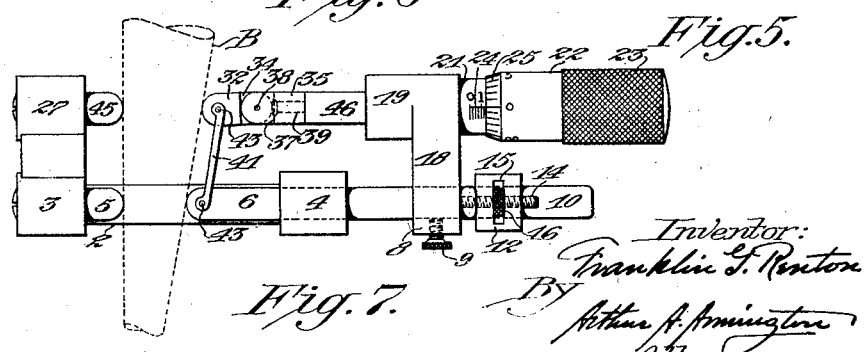

Fig. 7, a plan view of the same.

Referring first to Figs. 1 and 2 of the drawings, 2 designates a U-shaped frame or yoke having bearings 3 and 4 for two of the calipering-elements. Secured in the left-hand bearing 3 is a fixed calipering-spindle or anvil 5 which projects therefrom partly across the opening of the frame 2, being rounded off at its end to adapt it to engage the side of the piece to be calipered. Arranged in axial alinement with the fixed anvil 5 is an adjustable calipering-spindle 6 which is slidable through a bore in the bearing 4. The spindle 6 projects to the left of the bearing 4 and is formed with a rounded end which coöperates with the end of the anvil 5 in calipering the piece to be measured. The right-hand end of the spindle 6 is fitted to a bore in an elbow-shaped member 8 and secured therein by a set-screw 9, see Fig. 5. The member 8 is mounted to slide along a rod or arm 10 projecting horizontally from the side of the frame 2, see Fig. 1, and it may be fastened in its adjusted position thereon by means of a thumb-screw 11 at its bottom adapted to bind against the rod. At the right of the member 8 is a collar 12 which is also adjustable along the rod 10 and adapted to be secured in fixed position thereon by means of a thumb-screw 13. A relatively fine pitch screw 14 reaches out from the side of the member 8 and projects through a bore in the collar 12. The top of the collar 12 is of triangular shape, as shown in Fig. 5, and is slotted vertically at 15, see Figs. 1 and 2, to adapt it to receive a knurled nut 16 which engages the threads on the screw 14. In setting the spindle 6 in relation to the fixed anvil 5 the thumb-screws 11 and 13 are released and the member 8 and collar 12 may then be slid along the rod 10 to slide the spindle in its bearing 4. After an approximate adjustment is made in this manner the collar 12 is clamped in place on the rod 10 by means of its thumb-screw 13, and a finer and more accurate adjustment of the spindle 6 may be accomplished by turning the nut 16 to slide the member 8 in either direction. After the spindle 6 has once been set in relation to the fixed spindle or anvil 5 it may be secured in permanent adjustment, when the instrument is to be used continuously as a gage, by tightening the set-screw 11.

Offset from the side of the adjusting-member 8 is an arm 18 carrying a bearing 19 for the auxiliary calipering-spindle 20 which is arranged in parallel relation with the adjustable spindle 6. The bearing 19 is provided with a sleeve or barrel 21 projecting from its right-hand end and formed with a threaded bore engaged by corresponding threads on the spindle 20 in accordance with the usual construction of micrometer calipers. At the outer end of the spindle 20 is a sleeve or thimble 22 provided with a knurled grip 23 by which it may be grasped in the fingers to screw the spindle through the barrel 21. The inner beveled end of the thimble 22 is adapted to register with graduations on a scale 24 marked on the surface of the barrel 21, and on the circumference of the bevel is a graduated scale 25 which cooperates therewith in the well known manner of a vernier.

Arranged opposite to and in axial alinement with the spindle 20 is a fourth calipering-spindle 26 which is adjustable in a bearing 27 formed on or attached in offset relation to the left-hand frame-bearing 3, see Fig. 2. The spindle 26 screws through a barrel 28, projecting to the left from the bearing 27, and carries a knurled thimble 29 rotatable about the barrel. The barrel 28 and thimble 29 are also provided with vernier scales 30 and 31 in accordance with the usual arrangement as embodied in the right-hand spindle 20.

As shown in Fig. 2, each of the spindles 20 and 26 carries a swiveled mounting at its end for the swinging gaging-tips or calipering-points 32 and 33. Referring to Fig. 4, the calipering-points 32 and 33 may consist of relatively short cylindrical rods formed with rounded ends corresponding to the semi-spherical ends of the spindle 6 and anvil 5. At their opposite ends the sides of the members 32 and 33 are slotted or milled off to provide flat tongues or shanks 34 by which they are hinged to the mountings 35 and 36 at the ends of the main spindles 20 and 26. The mountings 35 and 36 for the gaging-tips or points 32 and 33 are constructed in the form of extensions at the ends of the spindles 20 and 26 and are cross-slotted at 37, see Figs. 2 and 4, to receive the tongues or shanks 34 of the tips. Extending through the sides of the slotted ends of the mountings 35 and 36 are cross-pins 38 on which the shanks 34 of the tips 32 and 33 are pivoted to adapt them to swing on an axis at right-angles to the axis of the spindles 20 and 26. The mountings or extensions 35 and 36 are fastened to the ends of their respective spindles 20 and 26 by means of axial studs 39 as shown in Fig. 4, the studs being driven or screwed into the spindles and provided with heads 40 at their outer ends for holding the mountings in place. It will thus be observed that the calipering-tips or points 32 and 33 are united to their spindles 20 and 26 by universal-joints, thus permitting a lateral swinging action of the tips in relation to their spindles and a relative rotative movement therebetween for a purpose as later explained.

Referring now to Fig. 2, it is to be noted that the swiveled tips 32 and 33 on the spindles 20 and 26 are connected to their opposite, parallel spindles 6 and 5 by means of cross-links 41. As shown in Fig. 3, the links 41 are preferably constructed from flat stock and formed with bifurcated portions or yokes 42 at their ends. The yokes 42 straddle the sides of the tips 32 and 33 and the spindles 6 and 5 and are pivotally connected thereto by means of cross-pins 43. Referring to Fig. 2, the purpose of this cross-connection between the adjustable spindles 20 and 26 and their opposite associated spindles 6 and 5 is to maintain the calipering-points of the instrument at a constant distance apart as regards their lateral relation. The links 41 are pivoted to the tips 32 and 33 and spindles 6 and 5 at points coinciding with the axes of their ball-shaped ends; and consequently, when the two adjustable spindles 20 and 26 are moved longitudinally toward or away from each other their tips 32 and 33 will be caused to swing on their pivots 38 whereby to maintain the axial centers of their ball-ends always at the same distance from the centers of the spherical contact-ends of the spindles 6 and 5. The distance between these centers of the calipering-points of the opposite, parallel spindles, as regulated by the length of the links 41, is established arbitrarily, any convenient unit of measurement being selected, say one inch or a fraction thereof. Hence, when the piece to be measured or gaged is calipered on opposite sides at these two separate points, which are maintained at a fixed distance apart, the taper will be indicated in a number of units per the predetermined unit of linear measurement, as for instance one-tenth inch taper per inch.

In Figs. 6 and 7 I have illustrated a somewhat simpler form of device having two fixed spindles or anvils 5 and 45. The opposite spindles 6 and 46 are adjustable in relation to the fixed anvils 5 and 45 in the same manner as those shown in Figs. 1 and 2, the spindle 46 being provided with vernier scales as is common in other types of micrometers. In this embodiment of the invention the second micrometer spindle is dispensed with and only one swiveled calipering-point 32 is required, this being linked to the forward end of the spindle 6 to maintain the constant distance between the gaging points. This form of instrument is accurate up to certain limits, but does not possess as great a capacity of measurement as that of the caliper first described.

Having now described the construction and arrangement of the parts of my improved device the method of applying it to use will next be explained: Referring first to the preferred embodiment of the invention as illustrated in Figs. 1 and 2, the adjustable spindle 6 is first set in fixed relation to the anvil 5, with their gaging-points at any convenient distance apart to adapt the tapered piece B, shown by dash lines in

Fig. 2, to be entered between them. This setting is accomplished by sliding the member 8 along the rod 10, using the adjusting nut 16 for fine adjustments when required, in the manner as hereinbefore explained. It will be understood that the adjustment of the member 8 also moves the spindle 20 to the same extent as the spindle 6 so that they retain their normal relation. When the piece B to be measured is a tapered spindle or the like having the same taper throughout its length the spindle 6 may be adjusted to a point where the smaller end of the taper will enter between its end and the micrometer-end of the anvil 5, and the micrometer-spindles 20 and 26 are then adjusted through their sleeves 21 and 28 to set the gaging-points 32 and 33 against the sides of the piece as shown in Fig. 2. The spindles 20 and 26 are preferably adjusted to the same extent, so that their verniers will read alike, and thus either reading will indicate the pitch or taper of one side of the piece in relation to its axis, while the sum of the readings will give the included angle between the two sides of the piece. This measurement of the tapers will be given in units of an inch for instance per a fixed unit of linear measurement taken on the tapered face which is determined by the lateral distance between the calipering-points 32 and 6 or 33 and 5. This distance remains constant as regulated by the connecting links 41 in the manner as before explained; that is to say, as the calipering-points 32 and 33 are moved back and forth toward or away from each other the links 41 cause the members 32 and 33 to swing on their pivots 38 so that the axes of their ball-shaped ends are kept at a uniform distance from the axes of the opposite calipering-members 6 and 5. It will also be observed that the links 41 restrain the members 32 and 33 from rotation, but the spindles 20 and 26 are free to rotate in relation thereto when they are screwed through their sleeves 21 and 28 as provided by the swiveled connection of the mountings 35 and 36 on the axial pins 39.

When the device is to be used as a gage in grinding or otherwise finishing work to a standard taper it is set as follows: The left-hand spindle 26 is adjusted in relation to its associated fixed spindle or anvil 5 to set their calipering- or gaging-points to the taper required. The spindle 6 is then set in permanent relation to the anvil 5 to adapt their ends to caliper the piece at any convenient point. Now, when the piece B is inserted between the ends of the spindles 5 and 6, with one side in contact with the end of the gaging-point 33, the opposite spindle 20 is adjusted to the same reading as the spindle 26 and if the taper of the piece is correct its sides will contact with the gaging-members at all four points. If the piece has not been brought to the required taper the right-hand spindle 20 may be turned to calipering position and the reading of its vernier will indicate the error or variation to guide the operator in the further grinding of the piece.

With the type of instrument shown in Figs. 6 and 7 the work is calipered in the same manner, except that only the one micrometer spindle 46 needs to be manipulated after the opposite spindle 6 has been set in fixed position. It will be understood that in this type of device the distance between centers of the fixed calipering-points or anvils 5 and 45 remains always the same, and the distance between the axes of the gaging-points on the spindles 6 and 46 is also maintained constant by the connecting-link 41 in whatever relative position of adjustment the spindles may be set. This applies for a limited range of adjustment only, however, and where a greater capacity is required the first described type of device is preferable as affording a wider range of adjustment.

I believe that I am the first to devise an instrument of the type herein specified which provides means for gaging tapered pieces at a plurality of points along their length while constantly maintaining the calipering-elements at a fixed distance apart in lateral relation during their adjustment against the sides of the piece. My new device is particularly simple in construction; easy and convenient of manipulation; and extremely accurate in use for gaging or measuring tapered pieces and inclined surfaces. Various modifications might be made in the structure and arrangement of the parts of the device without departing from the spirit or scope of the invention; therefore, without limiting myself to the embodiments herein shown and described, what I claim is:

1. In an instrument for measuring tapered pieces having opposite angular faces, the combination of two pairs of elements for gaging the work at a plurality of points spaced at a predetermined distance apart, said gaging-elements formed with rounded ends to adapt them to contact with the angular faces at opposite points in a single plane, and means for adjusting the gaging-elements against the work while maintaining a constant spaced relation therebetween.

2. In a caliper for gaging tapered pieces having opposite angular faces, the combination of two pairs of associated spindles having ball-ended tips for calipering the sides of the work at opposite points in a single plane, and means for maintaining the calipering-tips of the spindle at a predetermined distance apart in lateral relation in whatever position of adjustment they may be set.

3. In a caliper for gaging tapers, the combination with two pairs of spindles for calipering the work at a plurality of points along its length, of gaging-members movable laterally across the axes of one pair of the spindles, and means connecting the gaging-members with their laterally associated spindles to maintain the tips of the calipering points at a uniform distance apart during their adjustment longitudinally in relation to each other.

4. In a caliper for gaging tapers, the combination with a frame, of two sets of calipering-spindles mounted on the frame, means to adjust the spindles longitudinally in relation to each other, gaging-elements pivoted to one set of spindles, and links connecting said gaging-elements with the opposite spindles of the other set to maintain the calipering-points of the spindles at a constant distance apart longitudinally of the faces being calipered.

5. In a caliper for gaging tapers, the combination with a frame, of two pairs of calipering-spindles mounted on the frame, means for adjusting the spindles longitudinally in relation to each other, a gaging element swiveled to the end of one of the spindles, and a link pivotally connected to the gaging-element with its opposite end pivoted to the laterally associated spindle whereby to maintain the calipering-points of the spindles at a constant distance apart longitudinally of the faces being calipered.

6. In a micrometer caliper for gaging tapers, the combination with a frame, of two sets of spindles for calipering the work at a plurality of points along its length, means for adjusting the spindles longitudinally in the frame, vernier scales for indicating the extent of adjustment of the spindles, laterally movable calipering-elements on certain of the spindles, and means for regulating the position of said calipering-elements to maintain a predetermined lateral relation between the contact-points longitudinally of the faces being calipered.

7. In a caliper for gaging tapers, the combination with a frame, of an arm projecting from the side of the frame, an adjusting-member movable along the arm, means for securing the member in different positions of adjustment on the arm, a spindle secured to said member and adjustable therefrom in the frame, and a second spindle carried by the adjusting-member and adjustable thereon in longitudinal relation to the first spindle.

8. In a caliper for gaging tapers, the combination with a frame, of a pair of calipering-spindles carried by said frame, an adjusting-member adjustable on the frame, a third spindle carried by said adjusting-member to adapt it for adjustment in relation to one of the spindles on the frame, and a fourth spindle adjustably mounted in the adjusting-member to adapt it for adjustment in relation to the other spindle on the frame.

9. In a caliper for gaging tapers, the combination with a frame having opposite bearings, of a calipering-spindle fixedly mounted in one of the bearings, a second spindle adjustable in a bearing offset from that of the first spindle, a third spindle adjustable in a bearing in axial alinement with that of the first spindle, and a fourth spindle adjustable in a bearing in axial alinement with the second spindle.

10. In a caliper for gaging tapers, the combination with a frame, of a fixed calipering-spindle on the frame, an adjustable micrometer-spindle mounted in the frame in offset parallel relation with the fixed spindle, a third spindle longitudinally adjustable on the frame in opposition to the fixed spindle, and a fourth spindle arranged in parallel relation with the third spindle and adapted for micrometer adjustment in relation to the opposite micrometer-spindle.

11. In a micrometer caliper for gaging tapers, the combination with a frame, of four opposite calipering-spindles arranged in parallel offset relation on the frame, calipering-members swiveled to the ends of two of the spindles, and means for maintaining said members with their contact-points at a fixed distance from the contact-points of the opposite related spindles.

12. In a caliper for gaging tapered pieces having opposite inclined faces, the combination of a U-shaped frame and two pairs of opposite measuring-elements adjustable on said frame to contact with the tapering sides of the piece, said measuring-elements arranged in spaced relation at a predetermined distance apart with their axes in a single plane at right-angles to the plane of the frame of the caliper.

In testimony whereof I affix my signature.

FRANKLIN G. RENTON.